Jan. 1, 1963 N. LIPKINS 3,070,822
ROAD STRIPER
Filed June 9, 1958 7 Sheets-Sheet 3

INVENTOR.
NORMAN LIPKINS
BY
*Froschtein, Froschtein & Klinger*
ATTORNEYS

Jan. 1, 1963 N. LIPKINS 3,070,822
ROAD STRIPER
Filed June 9, 1958 7 Sheets-Sheet 4
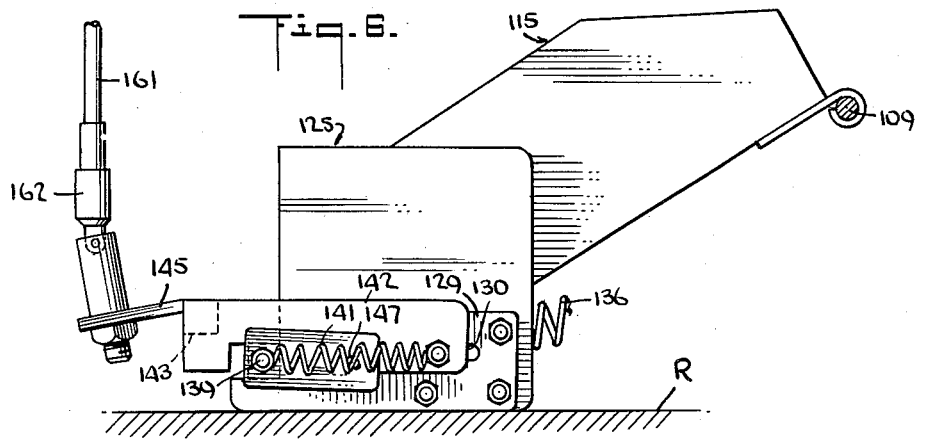
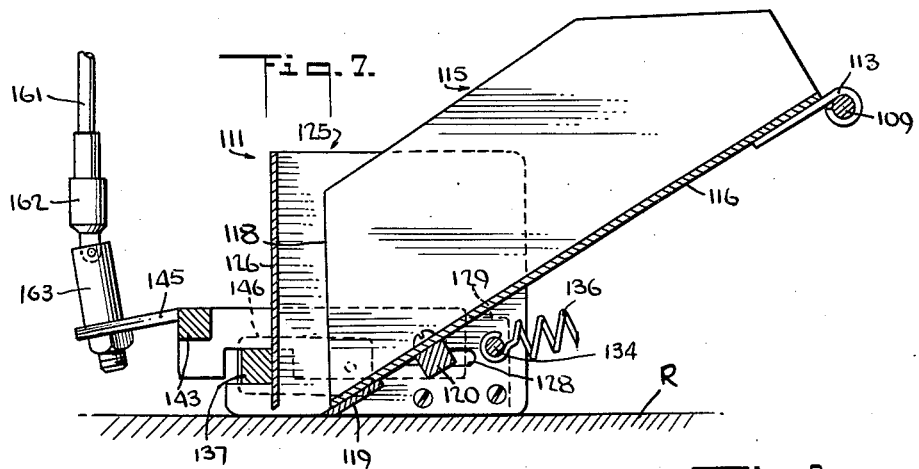
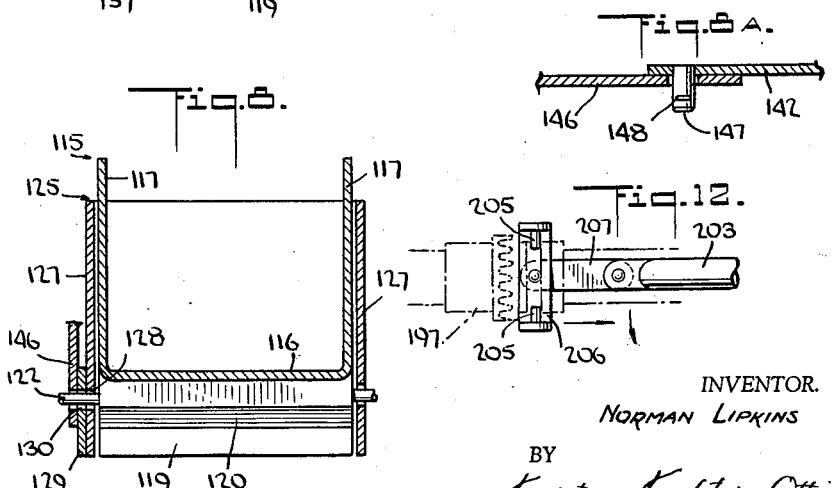
INVENTOR.
NORMAN LIPKINS
BY
ATTORNEYS

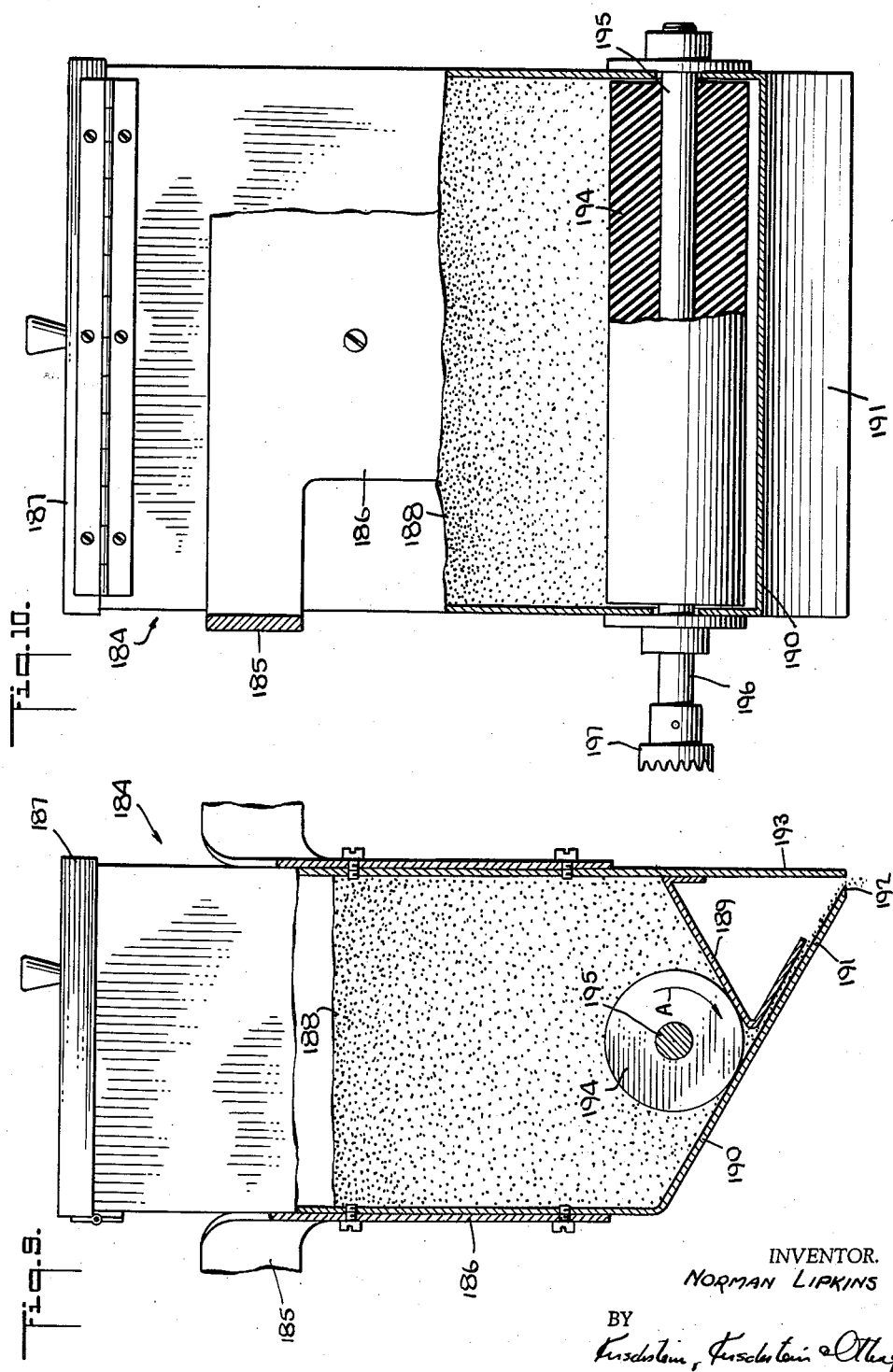

Jan. 1, 1963
N. LIPKINS
3,070,822
ROAD STRIPER
Filed June 9, 1958
7 Sheets-Sheet 6
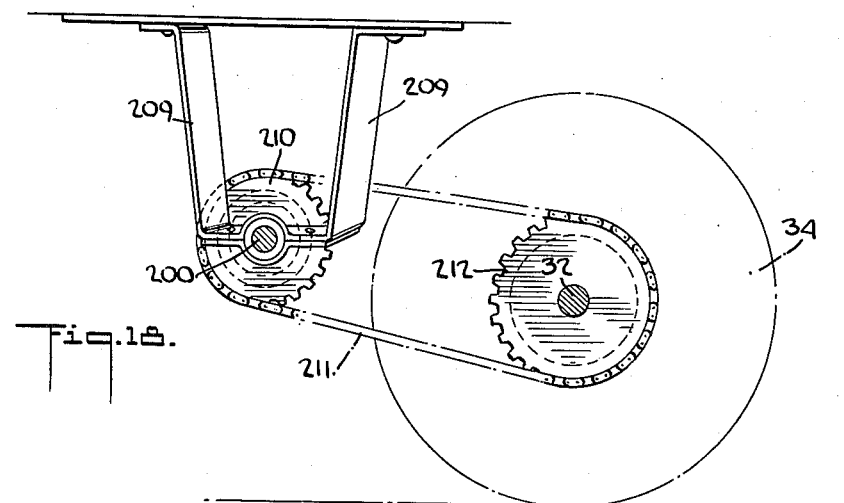
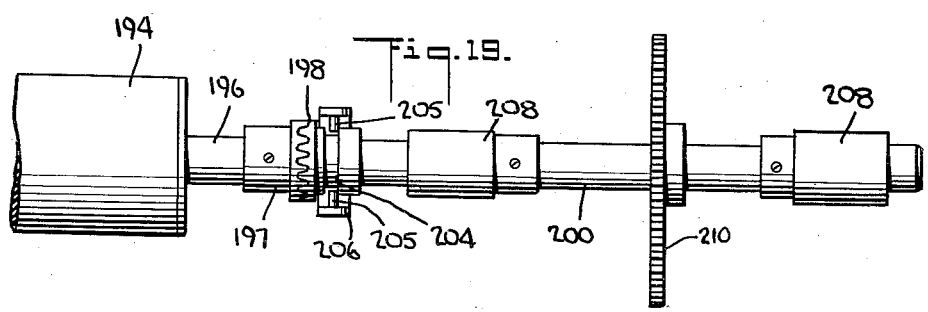
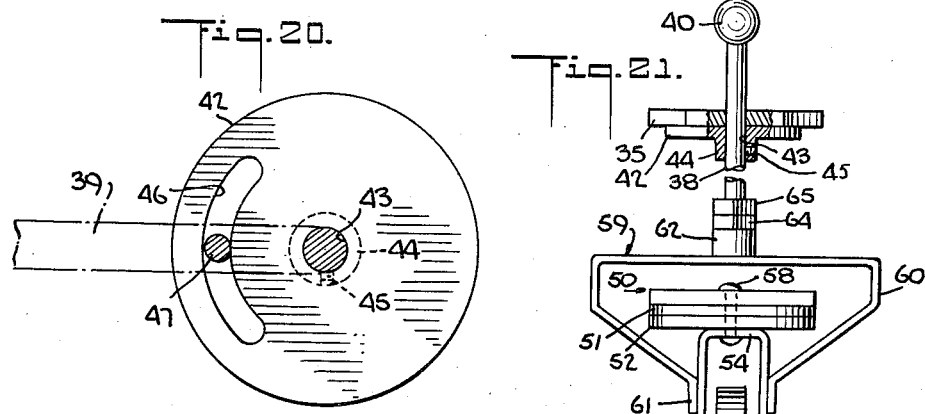
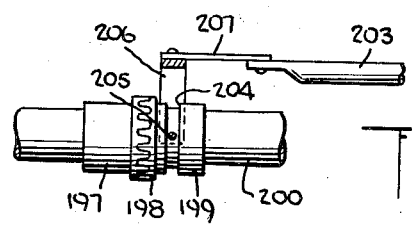
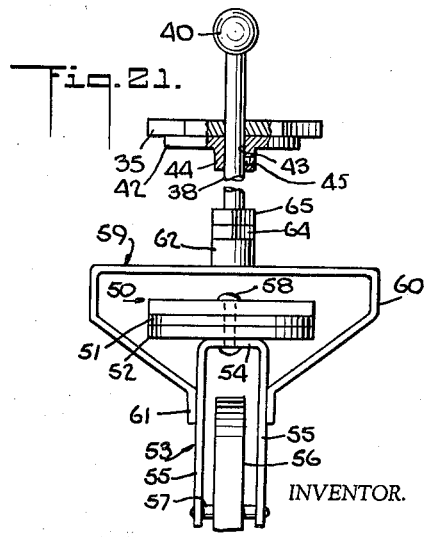
INVENTOR.
BY  NORMAN LIPKINS
ATTORNEYS Jan. 1, 1963   N. LIPKINS   3,070,822
ROAD STRIPER
Filed June 9, 1958   7 Sheets-Sheet 7
FIG. 14.
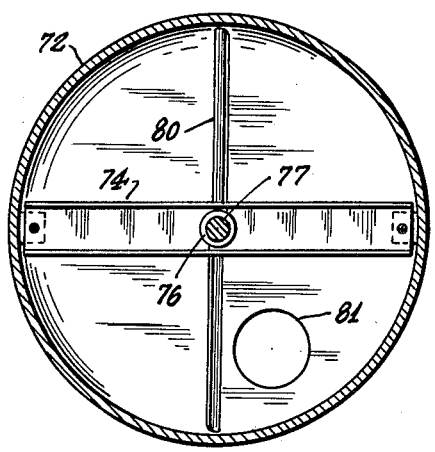
FIG. 16.
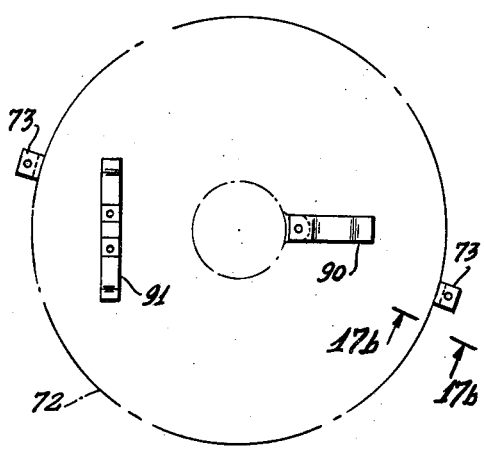
FIG. 15.
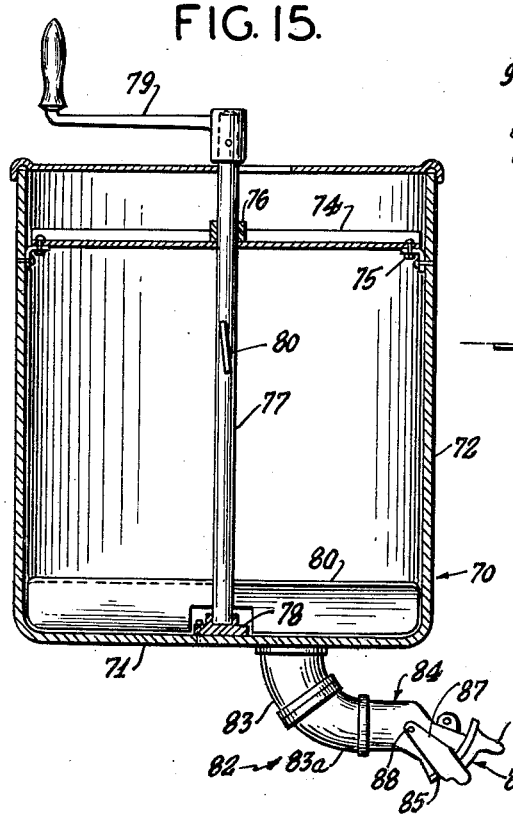
FIG. 17.
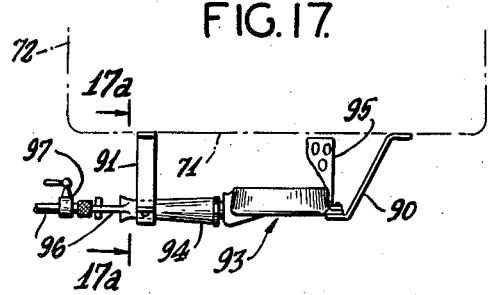
FIG. 17a.
FIG. 17b.
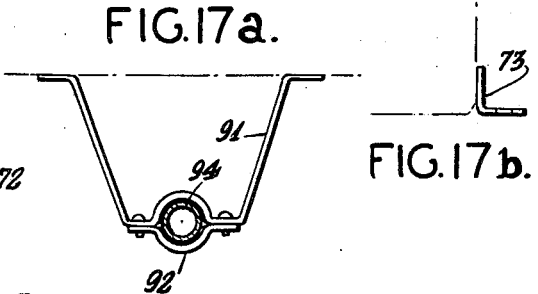
INVENTOR.
NORMAN LIPKINS
BY
ATTORNEYS United States Patent Office 3,070,822
Patented Jan. 1, 1963

3,070,822
ROAD STRIPER
Norman Lipkins, Great Neck, N.Y., assignor, by mesne assignments, to Perma-Line Manufacturing Corporation of America, Chicago, Ill., a corporation of Illinois
Filed June 9, 1958, Ser. No. 740,880
1 Claim. (Cl. 15—503)

This invention relates to a road striper, i.e., a striper which is adapted to place a long lasting marking on a roadway.

It is an object of the present invention to provide a road striper which can apply a road marking rapidly, cleanly, easily, efficiently, and with a minimum of care.

It is another object of the present invention to provide a road striper which, without any effort on the operator's part, will deposit a long lasting stripe on irregular as well as regular road surfaces.

It is another object of the present invention to provide a road striper which is particularly adapted to lay down a uniform, clean stripe of a hot-fluid solventless water-insoluble settable synthetic plastic resin under such conditions that the stripe and road surface are intimately bonded, whereby the stripe will remain in place for years under normal traffic conditions.

It is another object of the present invention to provide a striper of the character described which also is adapted, at the option of the operator, to apply reflective material to the exposed, and as yet unset, surface of a freshly deposited solventless synthetic plastic road stripe.

It is another object of the present invention to provide a striper of the character described wherein the width of the stripe can be changed readily and with ease, even by unskilled operators.

It is another object of the present invention to provide a striper of the character described in which, when a change is made in the width of the solventless synthetic plastic plastic resin stripe deposited, a corresponding change can be made with equal ease in the width of the reflective material discharged onto the stripe.

It is another object of the present invention to provide a striper of the character described which constitutes relatively few, simple and easily assembled parts that can be manufactured at a low cost, that is durable and foolproof, and which, despite wide variations in the state of the weather, the state of the road and the quality of the personnel employed, is capable of always depositing a clean looking, uniform, well bonded plastic stripe.

Other objects of my invention in part will be obvious and in part will be pointed out hereinafter.

My invention accordingly consists in the features of construction, combinations of elements and arrangements of parts which will be exemplified in the road striper hereinafter described, and of which the scope of application will be indicated in the appended claim.

In the accompanying drawings in which is shown one of the various possible embodiments of my invention, FIG. 1 is a partly cut away top plan view of a road striper made in accordance with my present invention;

FIG. 6 is a side view of the striper die shown in open position and engaging the road surface;

FIG. 7 is a longitudinal vertical cross-sectional view through the die in the position shown in FIG. 6;

FIG. 8 is a cross-sectional view taken substantially along the line 8—8 of FIG. 4;

FIG. 8a is an enlarged sectional view taken substantially along the line 8a—8a of FIG. 4;

FIG. 9 is a partially broken away side view of the hopper and distributor for the reflective material;

FIG. 10 is a partially broken away front view of said hopper and distributor;

FIG. 11 is a top view of the distributor clutch, the same being shown in closed position;

FIG. 12 is a front view of the distributor clutch in the same position as in FIG. 11;

FIG. 13 is a view similar to FIG. 12, but illustrating the clutch in open position;

FIG. 14 is a cross-sectional top view of the reservoir tank;

FIG. 15 is a cross-sectional vertical view of the tank;

FIG. 16 is a top plan view of the tank supports;

FIG. 17 is a side view of the tank heating mechanism;

FIG. 17a is a sectional view taken substantially along the line 17a—17a of FIG. 17;

FIG. 17b is an auxiliary view taken substantially along the line 17b—17b of FIG. 16;

FIG. 18 is a sectional view taken substantially along the line 18—18 of FIG. 1;

FIG. 19 is a side fragmentary view of the distributor actuating mechanism, the same being taken substantially along the line 19—19 of FIG. 1;

FIG. 20 is a sectional view through the steering post, the same being taken substantially along the line 20—20 of FIG. 2; and FIG. 21 is a rear cross-sectional view of the steering mechanism.

Figure 1:
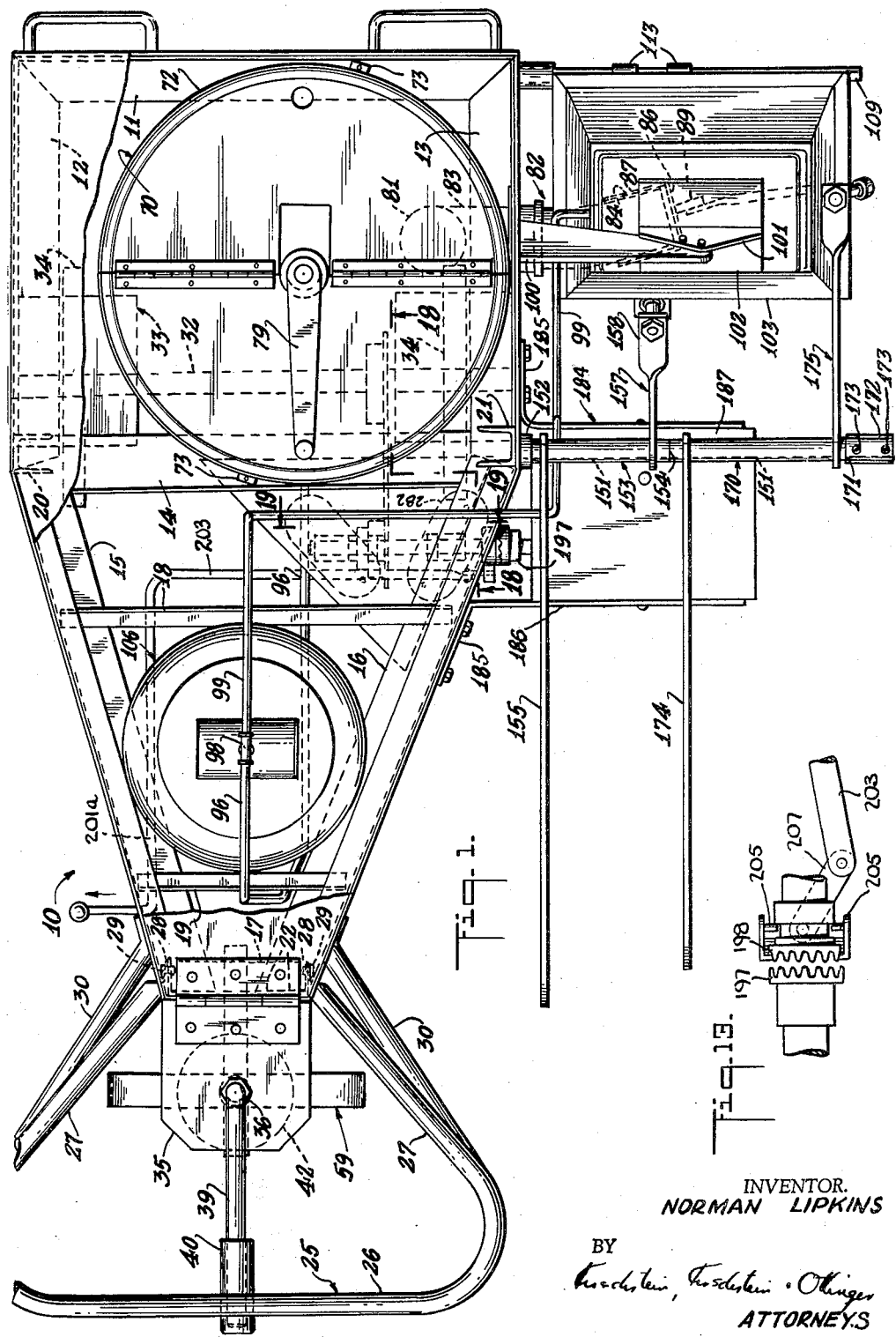

Referring now in detail to the drawings, 10 denotes a road striper in accordance with the present invention. The road striper is built with a supporting framework consisting of L-shaped or U-shaped cross-section iron bars which are welded or otherwise joined together in a suitable manner. The front of the road striper is formed with an angle iron frame member 11. Extending rearwardly from the outer ends of the member 11 are a pair of parallel side members 12 and 13. The joints between the members 11 and 12 and between the members 11 and 13 may be mitred. Interconnecting the rearward ends of the members 12 and 13 is a frame member 14 parallel to the member 11 so as to form a rectangle. Extending rearwardly from the intersection of the members 12 and 14 is a rearwardly extending frame member 15 and extending rearwardly from the intersection of the members 13 and 14 is a frame member 16. Rearwardly extending members 15 and 16 converge and are joined by a short connecting bar 17 at the rear of the frame. A forward strut 18 and a rearward strut 19 reinforce the trapezoid thus formed. Extending upwardly from the intersection of the frame members 12, 14 and 15 is a frame member 20, U-shaped in cross-section, and extending upwardly from the intersection of the members 13, 14 and 16 is a U frame member 21. Extending upwardly from the rear end of the frame is a channel-shaped member 22. The lower end of the member 22 extends across the bar member 17 and may be welded to the bar 17 and the rear ends of the frame members 15 and 16. Other frame members, supports, reinforcing struts, and the like may be included in the construction as desired or found necessary.

A handle 25 is provided which has a grip bar 26 located rearwardly of the striper frame and perpendicular thereto, and forwardly extending portions 27 running from the ends of the grip bar 26. Portions 27 extend forwardly and inwardly so as to meet the narrow rear end of the frame. The ends of the portions 27 of the handle are flattened and each is formed with a hole therethrough. The side walls of the channel member 22 are formed at their upper ends with a hole 28 which is threaded. The flattened forward ends of the members 27 of the handle 25 are positioned over the side walls of the channel member 22 so that the holes 28 register with the openings in the ends of handle members 27 and are secured with bolts 29. A handle support member 30 is attached to the underside of each handle member at the portion 27 and extends downwardly therefrom to the sides of the frame members 15 and 16. The lower forward ends of support members 30 are flattened and formed with holes. The frame members 15 and 16 are correspondingly formed with threaded openings, and the handle supports 30 are attached to the frame members by means of threaded bolts 31 extending through openings in the supports to engage the openings in the frame members.

A spaced pair of wheel arbors 33 is provided below the frame members 12 and 13 for supporting a pair of wheels 34 on an axle 32. The axle 32 extends between the arbors 33 and is held in position by arbor end plates 33a. The axle 32 turns with the wheels.

Secured, as by welding, to the upper rear end of the frame and to the member 22 thereof, is a metal plate 35. The plate 35 extends rearwardly in a horizontal plane from the striper frame and is formed at the center with a hole 36. A second hole 37 is formed in the plate 35 spaced to the rear of the hole 36. Extending vertically through the hole 36 is a post 38 which is formed above the plate 35 with a rearwardly extending arm 39 which is the steering control arm of the road striper, and is provided with a rubber handle grip 40. The lower end of the vertical post 38 is formed with screw threads 41. Positioned immediately below the plate 35 is a circular plate 42 which is formed with a central opening 43 so as to fit about the post 38 of the steering arm and a downwardly extending collar 44, which surrounds the post 38 and is fixed thereto by means of a set screw 45. Adjacent the outer rearward edge of the circular plate 42 is a curved slot 46 formed adjacent the outer circumference thereof and concentric with the opening 43. The slot 46 and hole 37 in the plate 35 are equally spaced from the post 38 of the steering arm. A bolt 47 having an enlarged upper head extends downwardly through the opening 37 in the plate 35 and through the slot 46 in the circular plate 42. A handle 48 formed at one end with an internally threaded socket 49 is attached by means of the socket 49 to the lower end of the bolt 47 so that rotating the handle 48 in one direction will tighten the socket 49 on the threads of the bolt 47 thus frictionally engaging the plate 42 and thereby clamping the plate 42 against the stationary plate 35. Since the plate 42 is secured to the post 38 by means of the set screw 45, the steering arm 39 cannot be moved when the plate 42 is clamped against the plate 35 by the socket 49 of the handle 48. When the handle 48 is moved in the opposite direction, it will release the plate 42 so that the steering arm 39 may be moved to the right or left.

A plate 50 is secured at the lower rear end of the frame to the rear ends of the members 15 and 16 and to the member 17, and extends rearwardly therefrom. A pair of large plate washers 51 and 52 are positioned horizontally beneath the plate 50. A wheel bracket 53 is positioned below the plate 50 and the washers 51 and 52. The wheel bracket 53 is formed with a horizontal top wall 54 beneath the plate washer 52 and a pair of downwardly extending side walls 55. A wheel 56 is suspended in a vertical position between side walls 55 by means of a suitable horizontal axle and a spacer arrangement 57. The plate 50 and washers 51 and 52 and top wall 54 of the bracket 53 are all formed with registered centrally located openings through which a two-headed bolt 58 extends in so as to fasten the plate, washers and bracket together and permit horizontal rotation of the bracket 53 and wheel 56.

A horizontal steering control bracket 59 is located above fixed plate 50 and is formed with a pair of downwardly extending side walls 60 and inwardly extending flanges 61 which are attached to side walls 55 of bracket 53, thus bracket 59 extends around plate 50 and washers 51 and 52 so as to control the wheel bracket 53. A socket 62 is secured at the center of the top wall of bracket 59 and extends upwardly therefrom.

Socket 62 is formed with a threaded opening 63 into which the lower threaded end 41 of steering post 38 extends, and is secured in position by a pair of lock nuts 64 and 65. Arm 39 therefore, by means of post 38 connecting to bracket 59 which in turn controls the wheel bracket 53, will control the steering of the striper cart.

Supported by frame members 11 and 14 is a reservoir tank 70. Tank 70 is formed with a flat circular bottom wall 71 and a cylindrical side wall 72 extending upwardly from wall 71. A pair of L-shaped corner brackets 73 secure the tank to frame members 11 and 14. As illustrated in FIG. 15, the tank is fitted at its upper end with a flat metal strip 74 across the diameter of the tank near the upper end thereof. Strip 74 is supported by riveted corner brackets 75. A vertical bushing 76 is located at the center of metal strip 74. A stirring shaft 77 extends vertically through bushing 76, from a step bearing 78 mounted at the center of bottom wall 71 of the tank. Shaft 77 extends slightly above the top surface of wall 72 of the tank and is provided with a handle 79 for rotation of the shaft 77. Two pairs of oppositely extending stirring blades 80 are located on shaft 77 and extend outwardly therefrom, one pair of blades being above the other pair of blades. When handle 79 is turned by hand, the shaft 77 will be rotated, and any liquid in the tank 70 will be stirred by the blade 80 to keep a uniform consistency in the material to be used for lining.

The striper of the present invention is designed for use with a striping compound the base, i.e., carrier, of which is a hot-fluid solventless settable synthetic plastic resin and in which there is dispersed an extender or aggregate, e.g., pulverulent dolomite, and a pigment. I have found that if a compound of this character is maintained fluid at an elevated temperature such that when it strikes a road surface it will remain fluid for at least a few seconds, the synthetic plastic resin will bond intimately and firmly with a thermoplastic road surface. Moreover, a stripe having a carrier of such a material, that is, of a settable synthetic plastic resin, laid fluid hot and solventless upon a thermoplastic road surface, is extremely durable from every aspect. Due both to its intimate bonding with the road surface and to the inherent durability of synthetic plastic resins, the hardened deposited stripe has no tendency to crack away from the road surface or to wear rapidly and therefore provides a clean long lasting stripe.

The temperature at which to deposit a settable synthetic plastic resin containing striping compound in accordance with the present invention is in the range of from 320° F. to 430° F., 400° F. being a preferred temperature.

Any settable hot-fluid synthetic plastic resin will function satisfactorily in accordance with my present invention which resin is heat stable, i.e., not deleteriously affected by heat, up to 430° F. for an appreciable period of time, that is, during a working day, which resin is water insoluble and which resin has a softening point of at least 120° F. Softening point is determined by filling the brass rings of an A.S.T.M. D36 asphalt softening point apparatus with hot-fluid striping material so that the material is flush with the top and bottom face of the rings. Next a 3.5 gram steel ball is centered on top of each of the rings, and the rings and a thermometer are assembled in the A.S.T.M. D36 apparatus so that the bottom of the thermometer bulb is flush with the bottom of the rings. The apparatus is then immersed in a glycerine bath so that the top of the steel ball is covered by glycerine. The glycerine is heated in such a manner that the temperature rise in the bath is approximately 4° C. per minute. The softening point is recorded as the temperature at which the balls completely drop through the material to be tested.

One excellent type of striping compound is disclosed in my copending application Serial No. 823,332 filed June 29, 1959, now abandoned, for a New Composition of Matter and assigned to the owner of the present application. The compound basically consists of a physical mixture of a modified glycerol phthalate and a modified rosin, specifically, modified colophony, which jointly constitute the synthetic plastic resin carrier together with additives such as a plasticizer, a pigment and an aggregate. By way of example, other satisfactory synthetic plastic resin carriers are: modified alkyd resins, e.g., glycerol phthalate modified by cotton seed oil and a rosin acid, and copolymers of tall oil esters and epoxy resin, e.g., such a copolymer in which there are about 100 parts by weight of the epoxy resin to 75 parts by weight of the tall oil ester.

It will be appreciated that when a fluid-hot synthetic plastic resin base striping compound is applied to a conventional thermoplastic road surface at a temperature in the range indicated, the heat of the liquid material will liquify the skin of the thermoplastic road surface to permit intermingling of the liquified portion of the road surface and the liquid synthetic plastic resin material. This admixture, due to the rapidly viscosifying nature of the synthetic plastic resin during setting, localizes at the interface between the stripe and the thermoplastic road surface so as to create the excellent bond hereinabove referred to.

It also should be observed that due to the presence of this unique bond the new stripe and road surface tend to expand and contract at approximately the same rate. Moreover, since the stripe includes a synthetic plastic resin base, there will be an inherently sufficient flexibility present in the material of the stripe for the same to yield with the expansion and contraction of the road surface if the coefficients of thermal expansion are not exactly matched.

In particular, those synthetic plastic resins preferably are employed which are least affected by the materials likely to be deposited on roads, such for instance, as mineral solvents, greases, oils, etc., these types of resins being well known to the art.

Accordingly, it is a desired feature of the present invention to utilize a synthetic plastic resin base striping compound such as described for marking a road surface, rather than, for instance, an asphaltic material, since a fluid-hot synthetic settable plastic resin has the ability to be handled and laid more cleanly and accurately, to maintain its shape under all adverse climatic and traffic conditions, to excellently resist corrosion and abrasion and, despite the high temperature of application, to harden very rapidly to a permanent marking.

Although the instant invention is preferably utilized in connection with asphaltic types of road surfaces, as for instance, asphalt roads, macadam roads, and black topped concrete roads, it also has been discovered that a striping compound including a water-insoluble settable synthetic plastic resin base such as described above, when applied in solventless fluid-hot condition, adheres well to concrete roads. However, as pointed out in copending application serial No. 740,537 filed June 9, 1958, now abandoned, for a Method of Marking a Hard Surface and assigned to the owner of the present application, it is preferable where the concrete roads are being striped to apply to the exposed surface thereof in the region to be striped, a film of an elastomeric resin to which film when set there is applied a stripe in accordance with the present invention.

It is necessary to keep the striping compound in the tank within the high range of temperatures mentioned, as well as to mix it frequently, in order to keep the compound in a free flowing liquid state so that it may be easily drained from the tank and applied to the road surface to be striped. A heating means for this purpose is provided in this invention and will be hereinafter described.

The bottom wall 71 of the tank 70 is formed with an opening 81. An outlet conduit 82 is fixed to opening 81 of tank 70. Outlet conduit 82 comprises a curved tubular neck-piece 83, fitted underneath opening 81 and fixed to the wall 71 of the tank, a second curved tubular neck-piece 83a attached to the lower end of neck-piece 83, a spout 84 secured to the lower end of neck-piece 83a and spout cover 86 hinged to the outer end of spout 84. The two neck-pieces 83 and 83a form an arcuate tube extending downwardly from below tank 70 and outwardly to the side thereof. The spout 84 is formed with an open end 85. The spout cover 86 is formed with a pair of arms 87 which extend about the sides of spout 84 and are hinged by pins 88 to the sides of spout 84. Spout cover 86 is formed with a manipulating projection 89. When spout cover 86 is lifted upwardly by means of projection 89, it will rotate about the axis of pins 88 in arms 87 to the open end 85 of spout 84 of outlet 82.

Attached to the underside of bottom wall 71 of tank 70 are a pair of brackets 90 and 91 which extend downwardly. Suspended between brackets 90 and 91 is a conventional gas burner 93 having a tubular extension 94 from one end thereof. Bracket 91 is provided with an additional clip 92 to hold the extension 94 of the gas burner. A wind guard 95 is mounted on the gas burner and extends upwardly between the burner and the bottom wall 71 of the tank. Extending outwardly from the extension 94 of the gas burner is a metal tube 96 provided with a cock 97. Tube 96 extends to the rear of the striper cart behind strut 19 where it is formed with a curved portion that extends upwardly and then forwardly to a point between struts 18 and 19 where it is joined to a T-shaped pipe fitting 98.

A second pipe 99 extends forwardly from pipe fitting 98 and outwardly through a series of suitable bends in the pipe to a point adjacent the outer side of frame member 13 and overlying conduit 82.

Located above conduit 82 is a bracket member 100 which is mounted on a suitable framing and extends outwardly from the frame to a point overlying spout 84. A second bracket 101 extends downwardly from the end of bracket 100 and is suitably formed so as to support a metal butane radiant gas burner 102. A heat directing metal skirt 103 extends downwardly and outwardly from burner 102. Tube 99 is connected to gas burner 102.

Gas is supplied to burners 93 and 102 by pipes 96 and 99 through a pressure reducing valve 105 joined to connector 98. A high pressure butane gas tank 106 rests on frame members 15, 16, 18 and 19 and is connected to the valve 105. The burner 102 has its own control cock (not shown).

Extending downwardly from the corner formed by frame members 11 and 13 is a vertical frame member 108. Extending outwardly from frame 108 at a point below burner 102 is a horizontal hinge rod 109. Also extending outwardly from frame member 108 below hinge rod 109 is an anchor peg 110. Pivotally mounted on hinge rod 109 is a striper die 111 which may be interchanged with other dies of different widths. Die 111 is illustrated in FIGS. 3 through 8. The die 111 is secured to hinge rod 109 by means of a hinge bracket 112 which has a pair of curled finger portions 113 which rotatably surround hinge rod 109. The flat portion of the hinge bracket 112 is secured, as by bolts 114, to one end of the die 111. The die is formed with a trough portion 115 having a sloped bottom wall 116 and a pair of parallel vertical side walls 117. The trailing edges 118 of side walls 117 form an acute angle with the bottom wall 116 of the trough (see FIG. 7). A reinforcing strip 119 is secured to the underside of bottom wall 116 of the trough 115 at the trailing edge thereof and extends slightly beyond the edge of the bottom wall. Spaced from strip 119 is a bar 120 also extending across the width of the trough and firmly secured underneath bottom wall 116 as by bolts 121. Bar 120 is square in cross section. Screwed into the ends of bar 120 are registered pivot rods 122. Pivot rods 122 extend outwardly from bar 120 and are formed with threaded ends 123 which receive nuts 124.

A doctor valve 125 is provided having a central doctor wall 126 and a pair of parallel vertical side walls 127. Doctor wall 126 extends across edges 118 of the trough 115 and side walls 127 extend forwardly towards hinge plate 112 and immediately outside of side walls 117 of the trough 115. Walls 126 and 127 are rectangular in shape. A horizontal slot 128 is formed adjacent the bottom edge of each side wall 127 of the valve that skids along a road surface during operations of the striper. Rods 122 extend through slots 128 so that the doctor valve is slidably pivoted on the pivot rods 122 extending from the bar 120 of the trough. A wear plate 129 is secured as by bolts 132 to the outside of each side wall 127 of the valve 125 and covers the lower half of each side wall thereby widening the skid edges of the doctor valve. Plates 129 are formed with horizontal slots 130 superimposed on slots 128 in the side walls of the doctor valve. Projecting from the lower end of the wear plates 129, rearwardly from wall 126 of the doctor valve, are a pair of tabs 131. Wear plates 129 are also formed at the upper corner opposite doctor wall 126 of the valve with a pair of through openings 133, as are side walls 127. A rod 134 extends through openings 133 and through the side walls 127 of the valve where it is secured as by nuts 135. A coil spring 136 extends between rod 134 and the anchor peg 110 on frame member 108. Spring 136 is looped around rod 134 and peg 110, at each end thereof and exerts a tensile force therebetween.

Firmly secured to the front face of doctor wall 126 of the valve 125 is a horizontal bar 137 which is attached as by bolts 138. At each end bar 137 is supported by tabs 131 of wear plates 129. Screwed into opposite ends of bar 137 are registered pivot rods 139. Pivot rods 139 receive nuts 140. Tensionally gripping each pair of pivot rods 122 and 139 and extending therebetween is a spring 141.

Springs 141 are held in place by nuts 124 and 140. Pivoted on the pivot rods 122, outside of wear plates 129, and extending upwardly therefrom are a pair of lever arms 142. Lever arms 142 are interconnected at their upper ends by a bar 143 so as to form a yoke. Lever arms 142 are formed adjacent their upper ends with registered notches 144 cut in the lower edges of said arms. Notches 144 are adapted to engage bar 137 of the doctor valve when lever arms 142 are swung pivotally downwardly as shown in FIGS. 6 and 7. Extending rearwardly from the center of bar 143 is an ear 145. Pivoted at one end on each pivot rod 139 is a link 146. Links 146 extend from pivot rods 139 to points between the ends of lever arms 142 and are pivoted there as by pins 147. Each pin 147 is provided with a locking cotter pin 148. The openings in the ear links 146 that rotatably receive the pins 147 are slightly oversized (see FIG. 8a).

Figure 4:
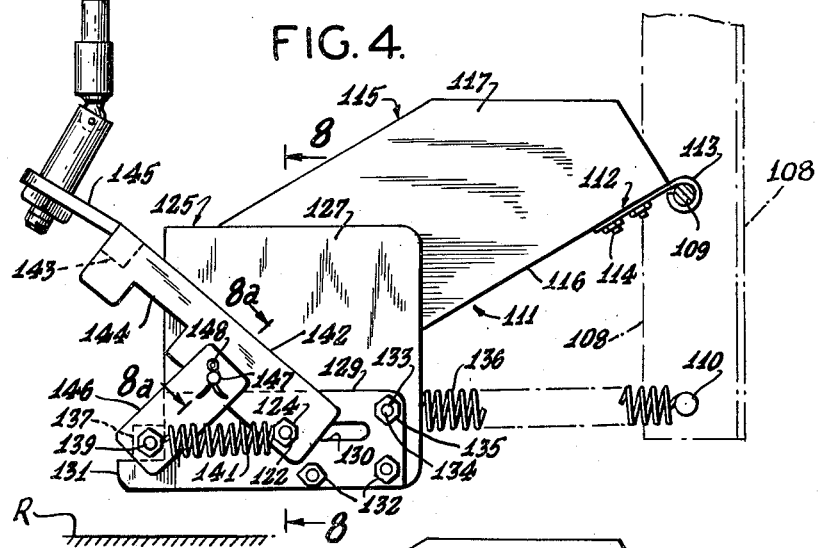
FIG. 4 is a side view of the striper die as it appears when closed and clear of the road surface.

The operation of the striping die 111 can best be understood by first considering the idle position of the parts as shown in FIG. 4. It will be assumed that at such time the trough 115 contains a solventless, settable synthetic plastic resin base which has been heated to fluidity. In the said idle position the ear 145 is in its uppermost position with the lever arms 142 being swung about the pivot rods 122 and held in such uppermost position by a manipulating linkage hereinafter to be described. A downwardly directed force is exerted on the ear by the spring 136 which acts to swing the entire die about the hinge rod 109 and thereby biases the rods 122 downwardly. This force is aided by gravity. At the same time the springs 141 pulling on the pivot rods 139 urge the centers of the lever arms 142 upwardly.

Figure 5:
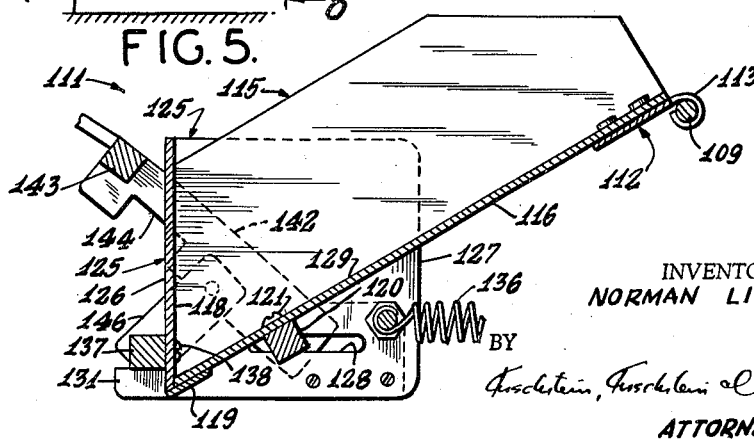
FIG. 5 is a sectional view taken substantially along the line 5—5 of FIG. 3, the striper die being shown in the same position as in FIG. 4.

Inasmuch as the pivot rods 122, and therefore the lower ends of the lever arms 142, are fixed relative to the trough 115, the action of the springs 141 is to pull the bar 137 toward the trough. This holds the doctor wall 126 against the open end of the trough and prevents discharge of heated fluid striping material from the striping die. The biassing effect of the spring 136 urges the discharge end of the striper die (the free end, i.e., the end remote from the hinge 109) downwardly into contact with a road surface R. However, such movement is prevented by the manipulating linkage above mentioned, which maintains this free end of the die elevated, i.e., spaced from the road surface, as indicated in FIG. 5. Therefore, as the striper is pushed along a road surface its movement will be unimpeded by frictional engagement between the striping die and said surface.

Figure 2:
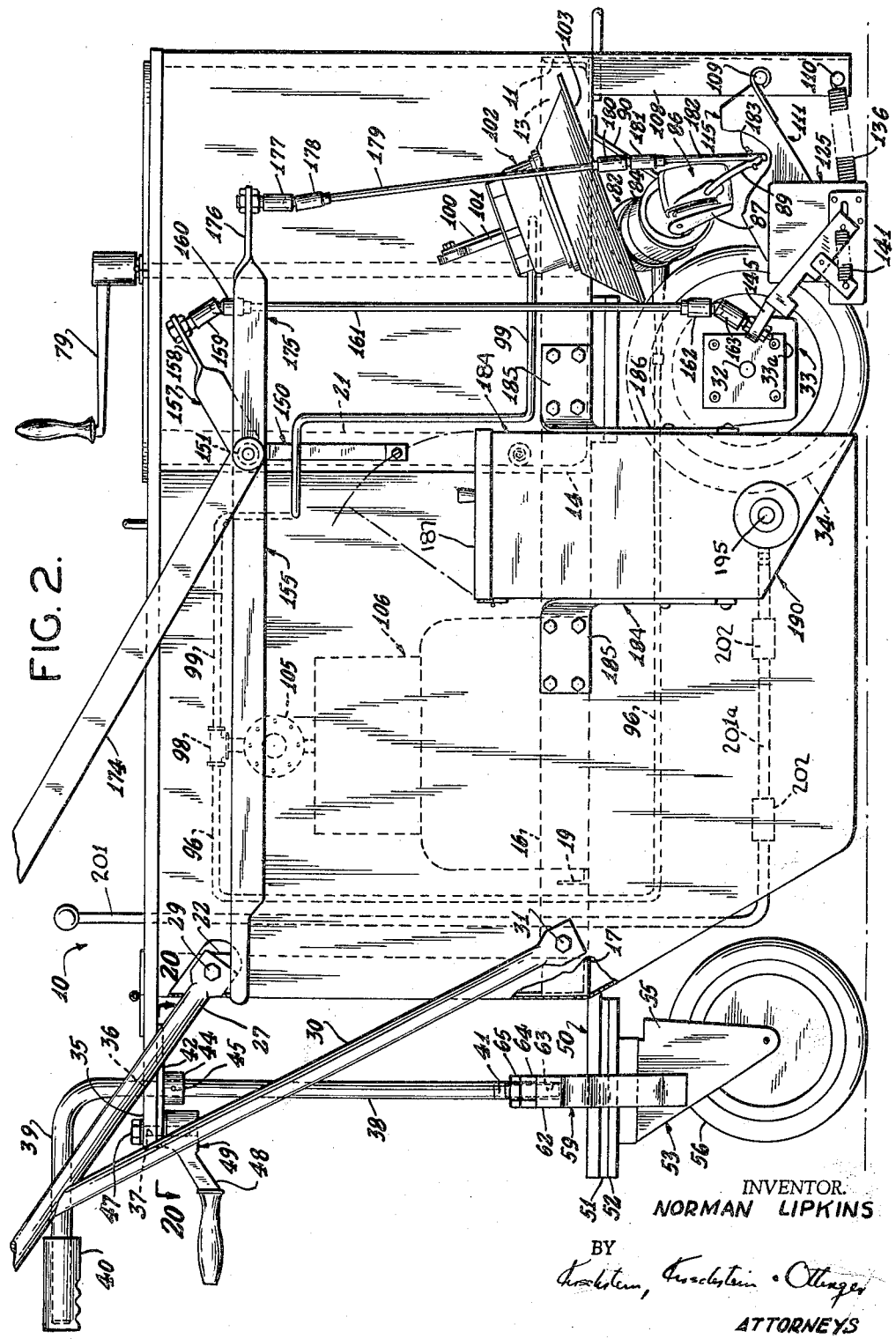
FIG. 2 is a partly cut away side view of the road striper with the striper die shown closed, but lowered to touch the road surface.
Figure 3:
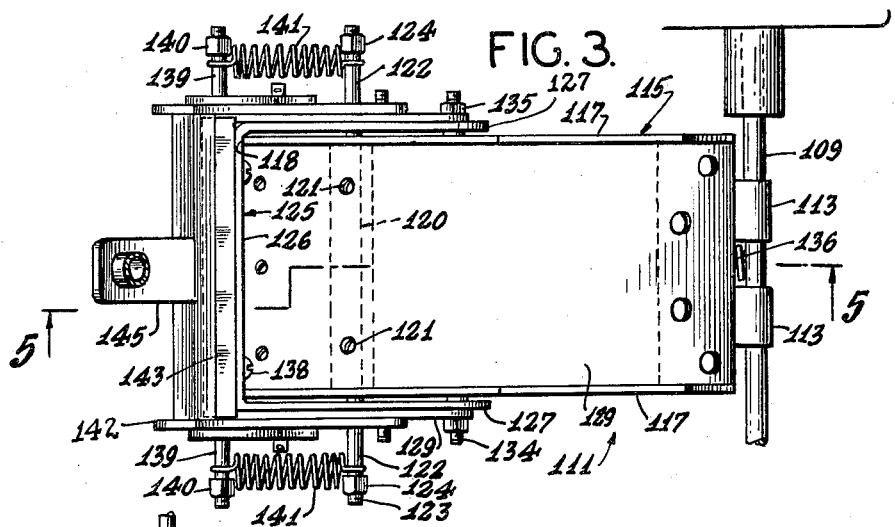
FIG. 3 is a top plan view of the striper die.

To render the striping die effective, the manipulating linkage is operated so as to move the lever arms 142 downwardly, i.e., so as to exert a downward pressure on the ear 145. The first effect of this downward pressure is to swing the free end of the striping die downwardly, i.e., to bodily move the doctor valve and the discharge end of the trough downwardly about the hinge rod 109 until, as shown in FIG. 2, the bottom edges of the side walls 127 of the trough and of the wear plates 129 engage the road surface. At this time the striping machine either can be stationary or in motion; but, since the striping die is about to open, it is preferred that the machine be in motion or be ready to move. This downward movement of the doctor valve and trough is unaffected by the spring 141 and is aided by gravity and the spring 136 although the latter assistance is not necessary to the operation of the machine, being a mere incident of the construction.

Further downward movement of the ear 145 will expand the toggles consisting of the links 146 and the lever arms 142, thereby increasing the distance between the pivot rods 122 and 139. This in turn shifts the doctor wall 126 away from the rear edges 118 of the trough, whereby to open the doctor valve and allow fluid to flow from the striping die.

Downward movement of the lever arms 142 is checked by engagement of the closed end of the notches 144 with the bar 137 as indicated in FIGS. 6 and 7. The bar 137, with the notches 144, the lever arms 142, the links 146, the pins 147 and the pivot rods 122, 139 are so relatively dimensioned and arranged that immediately before the closed ends of the notches 144 strike the bar 137 the pins 147 will cross the common plane containing the parallel pivot rods 122, 139. Thus as the lever arms 142 move from their uppermost positions shown in FIGS. 4 and 5 to their lowermost positions illustrated in FIGS. 6 and 7, the pins 147 will move across the imaginary plane extending between the axes of the hinge rods 122 and 139. Immediately after this occurs the hinge rods 122, 139 will start to move back toward one another, but such motion is checked almost immediately due to abutment of the notches 144 against the bar 137. The spring 141 by its biassing pressure which tends to draw the pivot rods 122, 139 together, will lock the doctor wall 126 and therefore the doctor valve 125 in the full open position shown in FIGS. 5, 6 and 7, whereby to permit a continuous discharge of the hot fluent striping material on the road surface. The operator therefore can release the manipulating linkage and concentrate his efforts on guiding and moving the striping machine.

It is rare to find an absolutely smooth road surface. Invariably after the surface has been laid defects occur therein. For example cracks and bumps develop by changes in temperature and depressions are created by the passage of heavy loads and partial failures in the ground beneath the road. In addition roads often are opened for the installation or repair of or connection to utilities and the patch which thereafter is made never exactly matches the original surface.

When a striping machine embodying the present invention is moved along such a surface, the striping die will automatically accommodate itself to these irregularities without deviating from its set rate of discharge. Phrased differently, the free end of the striping die will raise and lower automatically to accommodate itself to variations in elevation of the road surface without shifting the position of the doctor wall 126 with respect to the trough 115. This is accomplished simply by virtue of the hinge connection 113 to the hinge rod 109 and the biassing effect of the spring 136. As the bottom edges of the side walls 127 and the wear plate 129 encounter an irregularity, they will swing up or down as the case may be with respect to the rod 109 in order to maintain engagement with the road surface, being urged into such engagement by the spring 136. During this movement the doctor wall remains fixed with respect to the trough, being held locked by the blocked toggle action of the lever arms 142 and links 146. In other words, the free end of the die simply rides on the surface of the road and the forces exerted to vary the level of the die do not act upon the blade which determines the rate of discharge of the die.

It also will be observed that the side plates 127 and wear plates 129 are free to turn with respect to the trough about the pivot rods 122 so as to enable the lower edges of these walls and plates to cock with respect to the trough 117 as they commence to ride over irregularities in the road surface. This angular deflection of the doctor valve likewise does not affect the blocked position of the toggle arms.

To close the striping die the operator simply moves the manipulating linkage so as to exert an upwardly moving force on the ear 145. Inasmuch as the spring 136 is a comparatively stiff spring and stronger than the springs 141 acting in unison, the initial upward lifting force exerted on the lever arms 142 will move the pins 147 upwardly beyond their dead center positions to unlock the toggles. Continued upward motion of the ear 145 permits the doctor wall to move back to closed position, being aided by the springs 141 which ultimately hold the doctor wall pressed against the rear edges 118 of the trough. Still further upward movement of the ear 145 lifts the free end of the striping die off the ground against the action of the spring 136.

If it is desired to provide a wider stripe or narrower stripe than that which will be laid down by the specific striping die at any time mounted on the machine, such die is removed and a die of a different width substituted for it. The removal is quite simple. The manipulating linkage is disconnected from the ear 145, and die slipped off the hinge rod 109 and a new die is set in its place.

Mounted vertically on the outside face of the central wall of channel frame member 21, is a bracket 150. The upper end of said bracket 150 is spaced slightly outwardly from the upper edge of the frame member 21. Extending outwardly from the upper end of bracket 150 is a hinge post 151. A washer 152 encircles the hinge post adjacent the frame member 21. Said hinge post 151 extends farther outwardly than the hinge rod 109. Encircling the hinge post 151 and extending outwardly from the washer 152 is an open-ended cylindrical sleeve 153 having a outer open end 154. Attached to said sleeve and extending rearwardly therefrom is a handle arm 155. Adjacent the outer end of the sleeve is a forwardly and upwardly extending arm 157 (see FIG. 2) formed with a flat forward section 158 to which is bolted a ball receiving socket 159. Received within the socket 159 is a ball connector 160 carrying a vertical push rod 161 at the lower end thereof. The push rod extends downwardly from the ball connector 160 to a point overlying the ear 145 of the striping die. A second ball connector 162 is attached to the lower end of the push rod with the ball and extending downwardly and received within a socket 163 that is bolted to the ear 145. This manipulating linkage for the striping die is such that the ear 143 is in raised position when the handle arm 155 is horizontal as shown in FIG. 2. When the arm 155 is swung upwardly by an operator the ear 145 will be moved downwardly to swing the die into contact with a road surface and to open the doctor valve as described above, thus allowing striping material to flow therethrough.

A second sleeve 170 is fitted over the hinge post 151 in a position to extend outwardly from the outer end 154 of the first sleeve 153. Said second sleeve terminates at an outer end 171 which abuts a cap 172 fitted over the outer end of the hinge post 151. The cap is locked to the end of the hinge post by set screws 173. Said cap retains both sleeves 153 and 170 on the hinge post. Extending rearwardly from the sleeve 170 is a second handle arm 174. Extending forwardly from the outer end of the sleeve 170 is a control arm 175 angled upwardly from the plane of control handle 174. When the handle arm 174 is horizontal, the corresponding control arm 175 will be raised. Said control arm 175 is formed with a horizontal flat forward portion 176 to which a ball receiving socket 177 is bolted so as to extend downwardly therefrom. Received within socket 177 is a ball connector 178 that is attached to a control rod 179 which extends downwardly alongside the heater skirt 103.

Attached to the lower end of the control rod is a socket 180 and associated ball connector 181 the latter of which is connected to a downwardly extending connecting rod 182 which in turn is pivotally joined by a pin 183 to the projection 89 of the tank discharge spout 84. When the control handle 174 is in the raised position illustrated in FIG. 2 the cover 86 will close the spout 84 of the tank outlet. When the handle 174 is lowered to a horizontal position, said cover 86 will be raised to allow the hot fluid plastic striping material to flow through the outlet 82 into the striping die 111.

Further in accordance with the present invention the road striper includes means for selectively depositing, as desired, upon a freshly laid, and therefore still tacky synthetic plastic road stripe, particulate material which is reflective in nature, so that the stripe will shine at night in the light of an automobile's headlight. Said means conveniently constitutes a source of supply for the reflective material, such, for instance, as a rectangular hopper 184 demountably held in any suitable manner, e.g., bolted by a bracket 185 and a strap 186, to the framework of the machine. The upper end of the hopper is closed by a hinged cover 187. Any of the usual reflective substances, as for instance, a mass 188 of reflective beads, is located in the hopper.

The bottom of the hopper is constructed to facilitate a controlled discharge of the reflective material. To this end, said bottom constitutes a front portion 189 and a rear portion 190 converging downwardly toward one another at the vertical center plane of the container so as to provide a wedge-shaped trough. The portions 189, 190 do not quite meet, thus forming a transverse discharge slot for the hopper. The discharged material is guided downwardly along a chute 191 which constitutes an extension of the bottom wall portion 190 to a linear exit zone 192 that is protected by a depending skirt 193 the side walls of which simply comprise continuations of the front and side walls of the hopper.

It will be observed by reference to FIG. 2 that the discharge from the hopper is but a short distance in back of the stripping die 111. It also may be mentioned that the side-to-side width of the hopper and therefore of the particulate discharge therefrom is matched to the width of the stripe deposited by the die 111. To this end the hopper 184 is removably secured to the framework of the machine, as specified hereinabove, thereby to enable a matching width of hopper to be used for any given striping die; that is to say, if the striping die is changed in the manner heretofore described in order to substitute therefor a die of a different width, at the same time the hopper will be changed to provide a discharge of reflective material the width whereof is slightly in excess of the width of the stripe deposited by the substituted striping die.

As is clear from the drawings the hopper is so located in back of the striping die as to overlap transversely the path followed by the discharge end of the striping die, thereby insuring full coverage of deposit of reflective material on the newly laid stripe of the hot fluid plastic substance.

The rate of discharge of the reflective particulate material from the hopper is controlled by the use of a suitable mechanism, so that there will not be a continuous free discharge, however small, of said material. For this purpose there is located in the hopper at the bottom thereof an elastomeric distributor roller 194 which is disposed immediately above the exit zone 192 and centrally between the bottom wall portions 189, 190. The distributor roller is secured on a transverse shaft 195 the ends of which are journalled in the side walls of the hopper. The shaft is so positioned in the hopper and the diameter of the distributor roller is so selected that the roller will lightly brush against both bottom wall portions 189, 190, thus effectively blocking flow of reflective material from the hollow interior of the hopper to the exit zone 192. However, it will be appreciated that when the roller is turned in the direction A it will, due to its elastic nature, carry between it and the bottom wall portion 189 reflective material from the mass 188 thereof in the hopper to the zone of discharge from the hopper.

To turn the distributor roller, one end of the shaft 195 extends a substantial distance beyond the side wall of the hopper, as at 196 (FIG. 19) and has mounted thereon one half 197 of a clutch. The clutch conveniently is of the multi-toothed radially splined type. The other half 198 of the clutch (see FIGS. 1, 11, 12 and 13) is dimensioned and shaped to engage the half 197. This arrangement enables the roller 194 to be easily deenergized so that an operator can selectively deposit or withhold the reflective material.

The clutch half 198 is carried by a sleeve 199 slidable on a drive shaft 200. Said drive shaft is formed with axial keyways (not shown) and the internal bore of the sleeve 199 is provided with splines (not shown) that ride in the keyways so as to permit the sleeve to be shifted axially of the shaft 200. In one position of the sleeve the clutch half 198 formed at an end thereof meshes with the clutch half 197, this position being illustrated in FIGS. 1, 11 and 19. In the other extreme position of the sleeve, the two clutch halves are decoupled as shown in FIG. 13.

To move the sleeve between its two extreme positions corresponding to engaged and disengaged conditions of the clutch, there is provided a manipulating linkage the operative end of which constitutes a control rod 201 (see FIG. 1). At its lower end the rod is formed with a forwardly extending arm 201a suitably journaled, as in bearings 202, thereby permitting the control rod to be swung laterally. The front end of the arm carries a transversely extending radius arm 203 which runs from the arm 201a toward the clutch half 198 and terminates short thereof. When the control rod 201 is erect the radius arm 203 is horizontal, as shown in FIG. 12. However, when the control rod is shifted away from its erect position to either side, the radius arm 203 will be swung away from horizontal position, as shown in FIG. 13.

The sleeve 199 is formed with a transverse annular groove 204 in which ride a pair of diametrically opposed pins 205 that are mounted on the opposite arms of a yoke 206 straddling the sleeve in the vicinity of the groove. The yoke is pivotally connected to one end of a link 207 the other end of which is pivotally connected to the swinging end of the radius arm 203. It now will be apparent that when said radius arm 203 is horizontal, it will force the two halves of the clutch into meshing engagement and that when said radius arm is inclined, it will pull the clutch half 198 away from the clutch half 197.

The drive shaft 200 is suitably journalled in bearings 208 mounted on the frame of the striper as with the aid of brackets 209 (see FIG. 18). Said shaft has secured thereto a sprocket 210 (see FIGS. 18 and 19) which engages a chain 211 that is trained around another sprocket 212 fastened to the front wheel axle 32. Thereby, so long as the two clutch halves are interengaged, movement of the striper forwardly will cause a corresponding movement of the roller 194 and therefore discharge of reflective material down the chute 191 and onto the still tacky freshly deposited plastic stripe.

It has been ascertained that reflective material thus deposited on the still soft stripe becomes firmly embedded in and secured thereto and will remain in place and effective for very long periods of time, despite the heavy passage of traffic.

The term "hot-fluid" as used herein denotes a material which is fluid when hot and is to be distinguished from the expresson "hot, fluid" which simply indicates that a certain material at a given time is hot and also is fluid.

It thus will be seen that I have provided a road striper which achieves the various objects of my invention and is well adapted to meet the conditions of practical use.

As various possible embodiments might be made of the above invention and as various changes might be made in the embodiment above set forth, it is to be understood that all matter herein described or shown in the accompanying drawings is to be interpreted as illustrative and not in a limiting sense.

Having thus described my invention I claim as new and desire to secure by Letters Patent:

In a road striper for marking a heat-plasticizable road surface which striper includes a tank for receiving a striping compound and a wheeled support for said tank: a horizontal rod, a trough mounted to turn about said rod and having an open discharge end, a spring biasing the discharge end of the trough downwardly, a doctor valve, means mounting said doctor valve for movement toward and away from the discharge end of the trough, said means including wear surfaces adapted to ride on a road surface, a toggle mechanism having one end pivoted to the trough and the other end pivoted to the doctor valve, spring means biasing the opposite ends of the toggle mechanism together, said toggle mechanism being extendable to a position in which a central pivot point thereof passes between the opposite ends of said mechanism so as to lock the toggle mechanism in open position, and a discharge conduit for leading compound from said tank to said trough.

References Cited in the file of this patent

UNITED STATES PATENTS

| | | |
|---|---|---|
| 1,588,837 | Jones | June 15, 1926 |
| 1,610,773 | Hansen | Dec. 14, 1926 |
| 1,726,832 | Hollingshead | Sept. 3, 1929 |
| 1,815,305 | Law | July 21, 1931 |
| 1,844,732 | Wilmeth | Feb. 9, 1932 |
| 1,990,545 | Hollingshead | Feb. 12, 1935 |
| 2,076,370 | Hollingshead | Apr. 6, 1937 |
| 2,347,233 | Abernathy | Apr. 25, 1944 |
| 2,420,410 | Blankner | May 13, 1947 |
| 2,824,502 | Rockwell et al. | Feb. 15, 1958 |
| 2,940,105 | Woellwarth | June 14, 1960 |

FOREIGN PATENTS

| | | |
|---|---|---|
| 556,909 | Great Britain | Oct. 27, 1943 |

OTHER REFERENCES

Asphalt Handbook published by the Asphalt Institute, College Park, Md. Copyright 1947, pages 57 and 230.